United States Patent
Hong et al.

(10) Patent No.: US 9,445,426 B2
(45) Date of Patent: Sep. 13, 2016

(54) APPARATUSES, METHODS AND COMPUTER PROGRAM PRODUCTS RELATED TO IMPROVEMENTS IN AUTONOMOUS DENIAL PROHIBITION MECHANISMS

(75) Inventors: Wei Hong, Beijing (CN); Jukka Tapio Ranta, Kaarina (FI); Haiming Wang, Beijing (CN); Na Wei, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 14 days.

(21) Appl. No.: 14/420,077

(22) PCT Filed: Aug. 6, 2012

(86) PCT No.: PCT/CN2012/079735
§ 371 (c)(1),
(2), (4) Date: Feb. 6, 2015

(87) PCT Pub. No.: WO2014/022959
PCT Pub. Date: Feb. 13, 2014

(65) Prior Publication Data
US 2015/0195848 A1 Jul. 9, 2015

(51) Int. Cl.
*H04W 72/12* (2009.01)
*H04W 88/06* (2009.01)

(52) U.S. Cl.
CPC ..... *H04W 72/1215* (2013.01); *H04W 72/1289* (2013.01); *H04W 88/06* (2013.01)

(58) Field of Classification Search
CPC .................. H04W 72/1215; H04W 72/1289; H04W 88/06; H04W 16/14
See application file for complete search history.

(56) References Cited

U.S. PATENT DOCUMENTS 8,526,388 B1 * 9/2013 Kaukovuori ........ H04W 72/082
370/329
9,002,282 B1 * 4/2015 de la Broise ............ H04B 1/40
375/144
(Continued)

FOREIGN PATENT DOCUMENTS

CN 101682933 3/2010
CN 101919302 12/2010

OTHER PUBLICATIONS

International Search Report Issued May 16, 2013 in PCT/CN12/079735 Filed Aug. 6, 2012.

*Primary Examiner* — Nathan Mitchell
(74) *Attorney, Agent, or Firm* — Oblon, McClelland, Maier & Neustadt, L.L.P.

(57) ABSTRACT

Aspects of the invention en-compass an apparatus and corresponding method and computer program product, wherein the apparatus comprises a controller, configured to cause communication via a first and at (east a second radio access technology, provide for setting of rules, which permit the apparatus to autonomously deny communication via the first radio access technology, detect a predetermined event in terms of the second radio access technology, responsive thereto, apply the rules and deny a communication via the first radio access technology, detect an occurrence of a further predetermined event in terms of the second radio access technology, while the rules prohibit to further deny a communication via the first radio access technology, decide, responsive thereto, to violate the rules and to permit to deny a further communication via the first radio access technology, and cause transmission of a violation indication to a destination of the communication via the first radio access technology. A network entity apparatus and corresponding method and computer program product are also envisaged.

19 Claims, 5 Drawing Sheets

(56) References Cited

U.S. PATENT DOCUMENTS

| | | | |
|---|---|---|---|
| 2005/0185629 A1* | 8/2005 | Kuroda | H04L 69/324 370/347 |
| 2008/0051085 A1* | 2/2008 | Ganton | H04W 88/06 455/435.2 |
| 2008/0125118 A1 | 5/2008 | Ormson | |
| 2008/0279137 A1 | 11/2008 | Pernu et al. | |
| 2010/0061326 A1 | 3/2010 | Lee et al. | |
| 2010/0304770 A1* | 12/2010 | Wietfeldt | H04W 72/1215 455/509 |
| 2012/0040715 A1* | 2/2012 | Fu | H04B 1/1027 455/553.1 |
| 2012/0069766 A1* | 3/2012 | Fu | H04B 1/406 370/252 |
| 2012/0188907 A1 | 7/2012 | Dayal et al. | |
| 2012/0281563 A1* | 11/2012 | Comsa | H04W 24/10 370/252 |
| 2013/0029704 A1* | 1/2013 | Koo | H04W 72/1215 455/501 |
| 2013/0114583 A1* | 5/2013 | Park | H04W 52/0216 370/338 |
| 2013/0225068 A1* | 8/2013 | Kiminki | H04W 52/0216 455/39 |
| 2014/0092761 A1* | 4/2014 | Behravan | H04W 24/02 370/252 |
| 2014/0126552 A1* | 5/2014 | Dayal | H04W 88/06 370/336 |
| 2014/0301315 A1* | 10/2014 | Wang | H04W 48/02 370/329 |
| 2015/0230286 A1* | 8/2015 | Feuersaenger | H04W 72/1215 370/252 |
| 2015/0282200 A1* | 10/2015 | Lee | H04W 72/12 370/329 |
| 2015/0296556 A1* | 10/2015 | Lee | H04W 76/027 370/338 |
| 2015/0382364 A1* | 12/2015 | Sharma | H04W 72/082 370/329 |

\* cited by examiner

APPARATUSES, METHODS AND COMPUTER PROGRAM PRODUCTS RELATED TO IMPROVEMENTS IN AUTONOMOUS DENIAL PROHIBITION MECHANISMS

FIELD OF THE INVENTION

The present invention relates to apparatuses, methods and computer program products configured to achieve improvements in autonomous denial prohibition mechanisms, and in particular to those related to IDC (In-Device Coexistence) autonomous denial prohibition mechanisms

BACKGROUND

Mobile communication is constantly making progress. Under one aspect of such progress, devices such as terminals are capable to communicate using more than one radio access technology RAT. Hence, in each such multi-RAT enabled device, plural RAT's and corresponding RAT communication units coexist. In view of such co-existence, in-device interference may occur and be detrimental to the device's performance.

General technical details of such scenarios, e.g. under LTE™ and coexisting other RAT's, such as ISM as an example only, and adopted communication protocols are publicly available. A repeated detailed description of each such property/functionality of the known LTE™ system is considered dispensable as those skilled in the pertinent art of technology will readily understand the description as given herein. Examples of the present invention exploit those basic properties and at least in aspects modify the functionality so as to obtain the advantages of at least some embodiments of the present invention.

Those devices in such multi-RAT scenarios comprise network transceiver devices or, more general, network entities eNB and terminals UE. A typical example, when applying LTE™ terminology, of such network entities reside in general in evolved NodeBs (eNB's), such as a macro eNB (of "large" coverage) and pico or femto eNBs. Terminals such as user equipments UE are present within the coverage of such entities. Further, a terminal may communicate with another entity such as an access point AP of another RAT, e.g. a WiFI™/ISM AP.

Figure 5:
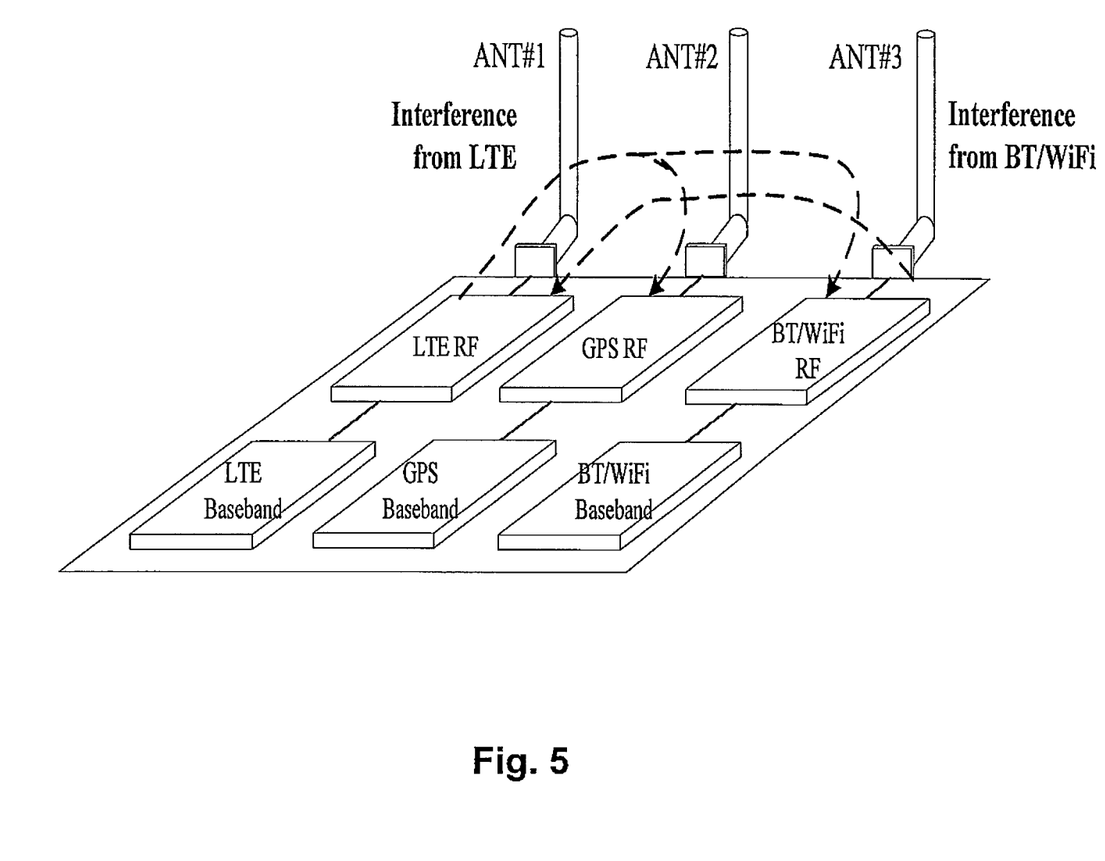
FIG. 5 illustrates one example a multi-RAT enabled UE on a block level.

Thus, as described, in order to allow users to access various networks and services ubiquitously, an increasing number of UEs are equipped with multiple radio transceivers. For example, a UE may be equipped with LTE, WiFi, and Bluetooth transceivers, and GNSS receivers. One resulting challenge lies in trying to avoid coexistence interference between those collocated radio transceivers. FIG. 5 shows an example of coexistence interference for three RAT's: LTE, GPS (example of GNSS), WiFI™ in terms of the baseband parts, the radio frequency RF parts and schematically the antennas thereof, as well as potential interference between some pairs of RAT.

Due to extreme proximity of multiple radio transceivers within the same UE, the transmit power of one transmitter may be much higher than the received power level of another receiver. By means of filter technologies and sufficient frequency separation, the transmit signal may not result in significant interference. But for some coexistence scenarios, e.g. different radio technologies within the same UE operating on adjacent frequencies, current state-of-the-art filter technology might not provide sufficient rejection. Therefore, solving the interference problem by a single generic RF design may not always be possible and alternative methods need to be considered. There is an ongoing work item in standardization bodies on this topic. Also, typically, there are four proposed usage scenarios:

1a) LTE+BT earphone (VoIP service)
1b) LTE+BT earphone (Multimedia service)
2) LTE+WiFi portable router
3) LTE+WiFi offload
4) LTE+GNSS Receiver Also, quite a few solutions are proposed to solve this potential interference, including TDM solution, FDM solution, and autonomous denial.

Autonomous denial is a good approach to remove the in-device interference for short-rare but critical WiFi/BT signaling. However, there are many concerns on the autonomous denial's negative impact in LTE system performance. For example, the eNB might interpret such autonomous denial as PDCCH failure, and might impact on PDCCH aggregation level, or wrong link adaptation, and eventually impact LTE system capacity. So, some proposals suggest setting a prohibition mechanism for LTE autonomous denial.

Two main approaches to restrict autonomous denials are:
1) setting a prohibit timer,
2) setting an autonomous denial rate.

For approach 1, after a UE performs autonomous denial, the prohibit timer starts to run, and it is not allowed to perform another (subsequent) autonomous denial until the prohibit timer expires.

For approach 2, a UE is only allowed to perform a limited number of autonomous denials during a certain period.

Note that when the period for both approaches is the same and the number of denials for approach 2 is set to 1, then the approaches are the same, thus, approach 1 is a borderline case of approach 2.

However, both approaches have a certain drawback as they can't deal with the unexpected significant ISM signaling.

For example, for approach 1, after UE performs LTE autonomous denial, the prohibit timer starts to run. But while the prohibit timer is running, another unexpected significant ISM signaling needs to be received. But according to the rule, UE can't receive it during the remaining period, because using autonomous denial of an LTE UL transmission is not possible, and then this significant ISM signaling will be missing which may cause big performance loss on ISM side, such as connection loss.

For approach 2, the same problem could happen. After the number of LTE autonomous denials reaches the configured limit, the UE will not be allowed to autonomously deny LTE UL during the remaining period. So if there is another unexpected significant ISM signaling that needs to be received during the remaining period, UE can't receive it because using autonomous denial of an LTE UL transmission is not possible, and then this significant ISM signaling will be missing which may cause big performance loss on ISM side, such as connection loss.

Since inherent to those mechanisms or solutions there are still issues to be solved, irrespective of the pre-existing proposals outlined above, there is still a need to further improve such systems.

SUMMARY

Various aspects of examples of the invention are set out in the claims.

According to aspects of the present invention, there are provided apparatuses as set out in claims 1 and 10, respectively.

Advantageous further developments of each such aspect are set out in respective dependent claims.

According to aspects of the present invention, there are provided methods as set out in claims 18 and 27, respectively.

Advantageous further developments of each such aspect are set out in respective dependent claims.

According to furthers aspect of the present invention, as set out in claims 35 and 36, respectively, there are provided computer program products comprising respective computer-executable components which, when the program is run on a computer, are configured to perform the above method aspects according to the independent as well as respective dependent claims, respectively.

That is, such computer program products also encompass computer readable storage media comprising a set of computer-executable instructions which, when the program is run on a device (or on a processor or processing unit thereof which may be part of a controller or control unit or control module), such as a network transceiver device eNB and its processor, cause the device to perform the method aspects. In particular, the above computer program product/products may be embodied as a computer-readable storage medium.

Accordingly, under at least some example aspects of this invention, improvements are achieved in that:
- drawbacks inherent to the approaches discussed above can be prevented,
- a process is proposed which can be flexibly adapted by eNB and/or UE
- an autonomous denial mechanism is proposed, which is more efficient than previous ones;
- receiving unexpected significant ISM signaling is enabled despite using an autonomous denial mechanism, which would otherwise prevent such receiving;
- adjustment of at least some parameters of the autonomous denial mechanism such, as denial rate or denial time, is adaptively possible, and
- it is enabled to achieve a better trade-off between LTE and ISM, or more generally, between respective RAT's which coexist in a device such as a UE
- according to at least some example aspects, more flexibility is introduced in autonomous denial usage scenarios,
- according to at least some example aspects, the eNB is aware of autonomous denial during negotiations for rule setting, so that eNB does not interpret an autonomous denial as PDCCH LA, and
- according to at least some example aspects, during re-negotiating rules settings, a UE and eNB can apply the previous rules until the negotiation is concluded.

Some embodiments of the present invention can be applied to/embodied in relation to e.g. LTE™ radio access, or LTE™-A radio access, in particular in e.g. modems and/or wireless devices and/or units and/or modules and/or chipsets thereof, in particular those related to/inserted in or insertable to network transceiver devices or network entities such as evolved Node B's, eNB's, whether macro eNBs or pico/femto eNBs, or related to/inserted in or insertable to terminals such as user equipments UEs or smartphones or multi-RAT enabled terminals, e.g. LTE/WiFi™/GNSS enabled terminals. Other standards (such as those defined in projects/by bodies named 2G, 3G, 4G, 3GPP, HSDPA, WCDMA, cdma2000, GSM, UMTS, IMS, 3GPP2, IEEE, IETF) may employ different names for those entities, but example embodiments may be equally applicable to those, e.g. NodeB's in UMTS or base stations BS in GSM, or mobile stations in GSM, as long as those may be deployed in e.g. at least a similar multi-RAT enabled scenario in which in-device coexistence and interference situations are concerned.

BRIEF DESCRIPTION OF DRAWINGS

For a more complete understanding of some example embodiments of the present invention, reference is now made to the following descriptions taken in connection with the accompanying drawings in which.

DESCRIPTION OF EXAMPLE EMBODIMENTS

Example aspects and/or at least some example embodiments of the invention will be described herein below.

Generally, some example embodiments of the invention are implemented in a framework of e.g. a telecommunication system and in which terminals are operated which are enabled to communicate using one or more RATs.

As a mere example only, the description refers to such modules, units or apparatuses related to network entities, eNBs, and terminals UEs which conform to various RATs (LTE™, Bluetooth BT, WiFi™/WLAN or ISM, GNSS, etc) and are arranged/configured/adapted for communication in such environment. However, this does not preclude the use of other entities and/or RATS comprising wireless communication modules/units achieving similar functionalities, or the use of other communication standards such as LTE™-A and beyond. Also, the bandwidth of wireless communication is not crucial for some example embodiments of the invention.

Figure 1A:
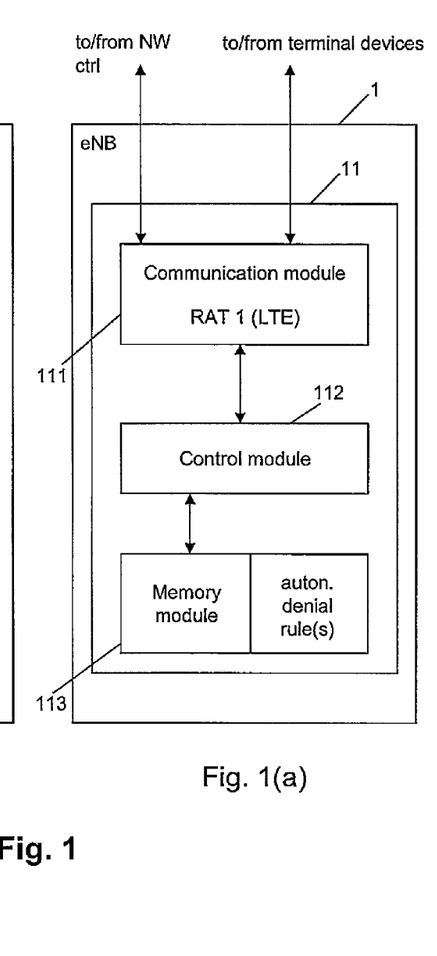
FIG. 1 shows an example scenario of some block circuit diagrams of a eNB, a UE, and an AP, respectively.
Figure 1B:
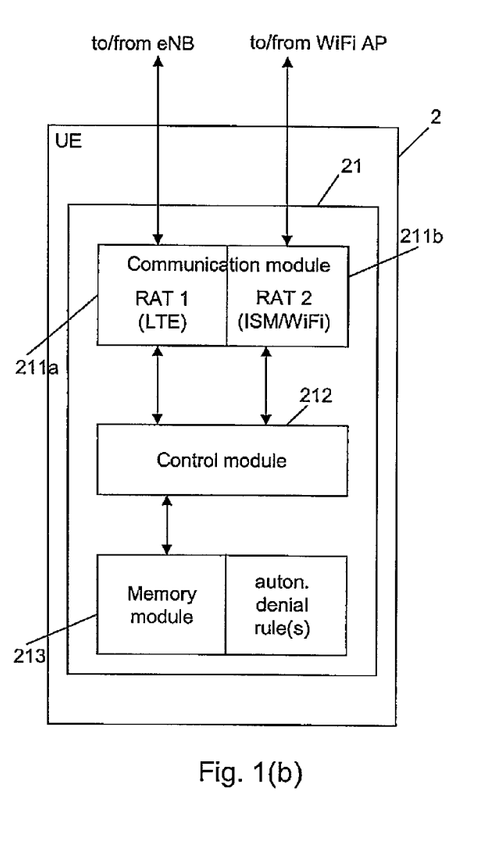
Figure 1C:
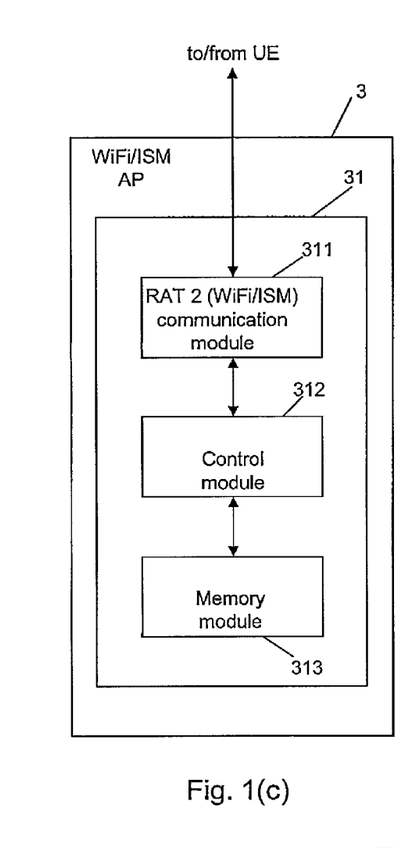

FIG. 1 shows an example scenario of some block circuit diagrams of a eNB, a UE, and an AP, respectively. Generally, the invention is implemented in apparatuses as for example schematically shown in FIG. 1. FIGS. 1(c), 1(a), and 1(b), respectively roughly illustrate a WiFi™/ISM access point (AP) as an example of an ISM source, a network entity such as an evolved NodeB (eNB), and a multi RAT enabled terminal such as a user equipment UE which is capable of operating under at lest two radio access technologies (RAT), illustrated in the example as LTE and WiFi™/ISM. Apparatuses in which aspects of the invention can be implemented may be part of such devices or entities referred to above, i.e. eNB, ISM AP, or UE.

FIG. 1(a) illustrates an apparatus in relation to a network transceiver device such as an evolved Node B, eNB, or the like. The apparatus 11 can for example be a part or a module (e.g. chipset) of the network transceiver device such as the eNB 1. The apparatus 11 comprises a communication module 111 configured for communication (here using LTE) with another network (e.g. NW control) entity as well as for communication with terminal devices UE denoted with numeral 2. That is, via the communication module 111, the apparatus 11 and/or eNB 1 may also communicate with a superordinated network entity (e.g. network control entity) located in e.g. the core network, such as a mobility management entity MME. Likewise, the eNB 1 communicates via the communication module 111 with terminals 2 such as user equipments UE or other terminals. The communication module 111 can bi-directionally exchange data with a control module 112 of the apparatus 11. The control module 112 may exchange data with a memory module 113. The control module 112 can be any kind of a processor or CPU or ASIC or the like, whether implemented in hardware or software. The memory module 113 can be a volatile or non-volatile memory such as a RAM or ROM, EPROM, EEPROM, Flash-memory or the like. The memory module 113 stores software code portions to be executed by the control module 112, in case of a software implementation. Also, the memory module 113 may store, at least temporarily, any other data such as rules for LTE autonomous denial, hereinafter ADR (autonomous denial rules). Also, in at least an exemplary embodiment, the memory keeps information as configured by the network or network entity 1 to the apparatus 11, and/or as to be configured by the eNB/apparatus 11 to the terminal devices, and/or as to be configured upon negotiation between the eNB/apparatus 11 and a respective terminal device, as will be explained in more detail herein below.

FIG. 1(b) illustrates an apparatus 21 in relation to a terminal device 2 such as an user equipment UE, or the like. The apparatus 21 can for example be a part or a module (e.g. chipset) of the terminal device such as the UE. The apparatus 21 comprises a communication module 211a and 211b configured to operate i) in a first mode, i.e. under a first radio access technology, RAT, such as LTE™ for communication with a network entity, i.e. in a cellular communication mode of the terminal, which involves the network transceiver device eNB in order to establish end-to-end communication between the terminal and a communication counterpart such as another terminal, as well as ii) in a second mode, i.e. under a second radio access technology, RAT, such as WiFi™/ISM for communication with one or more other devices, i.e. in a non-cellular communication mode of the terminal, which does not involve the network transceiver device eNB in order to establish end-to-end communication between the terminal and a communication counterpart such as another terminal or accessory equipment such as a headset, or, an access point AP.

More than two RAT's may be enabled in a same terminal, e.g. a RAT which is used for purposes of a GNSS, Global Navigation Satellite System may also be present.

That is, via the communication module 211a and 211b, the apparatus 21 and/or UE may either communicate via the network entity with another terminal device, or directly with another device (without involvement of an eNB). The communication module 211a and 211b can bi-directionally exchange data with a control module 212 of the apparatus 21. The control module 212 may exchange data with a memory module 213. The control module 212 can be any kind of a processor or CPU or ASIC or the like, whether implemented in hardware or software. The memory module can be a volatile or non-volatile memory such as a RAM or ROM, EPROM, EEPROM, Flash-memory or the like. The memory module 213 stores software code portions to be executed by the control module 212, in case of a software implementation. Also, the memory module 213 may store, at least temporarily, other any data such as rules for LTE autonomous denial, hereinafter ADR (autonomous denial rules). Also, in at least an exemplary embodiment, the memory keeps information as configured by the network device eNB to the apparatus 21, and/or as to be configured by the eNB 1/apparatus 11 to the terminal devices 2/apparatuses 21, and/or as to be configured upon negotiation between the eNB 1/apparatus 11 and a respective terminal device 2/apparatus 21, as will be explained in more detail herein below.

FIG. 1(c) shows a similar internal composition of a WiFi™/ISM access point configured to operate in e.g. the ISM band (Industrial Scientific Medical) as an example of a second RAT different from the LTE. Similar functionality is imparted to its constituents as described before with reference to FIG. 1(a)/1(b).

Figure 2:
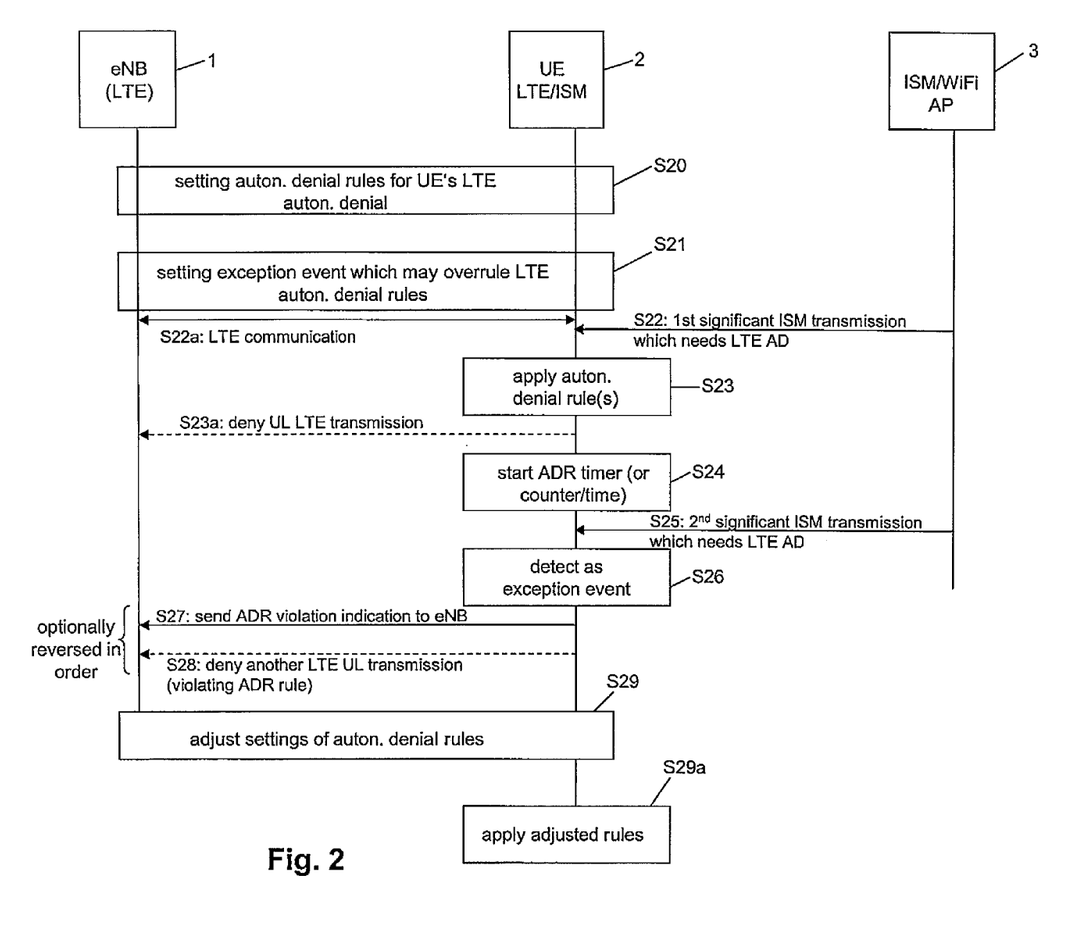
FIG. 2 illustrates a signaling diagram exemplifying at least some aspects of the invention in relation to signaling/processing between/at entities involved.

FIG. 2 illustrates a signaling diagram exemplifying at least some aspects of the invention in relation to signaling/processing between/at entities involved. FIG. 2 shows a signaling diagram of exemplary signaling and processing as performed according to at least some example aspects of the present invention at least at some example entities. FIG. 2 shows in horizontal direction the entities involved such as an eNB 1 operating under LTE as a first radio access technology RAT, a user equipment or terminal UE 2 operating under at least LTE and ISM, and further an ISM/WiFi access point as an ISM source, for example denoted by numeral 3.

In vertical direction, the respective signals and/or processings as performed at a respective entity or entities, that is, a respective apparatus at such entity is illustrated. Those are labeled in FIG. 2 with reference numerals S20 through S29a. In a stage S20, eNB 1 and UE 2 call and/or cause a setting of autonomous denial rules for an user equipment's LTE autonomous denial being effected. This, according to at least one option, can be accomplished in that the eNB sends a configuration to the respective UE. Alternatively, UE 2 and eNB 1 may discuss with each other using a so-called IDC indication/response procedure to agree on an autonomous denial rule for the user equipment's LTE autonomous denial and finally to set up such rules and to set those autonomous denial rules (hereinafter ADR) at the eNB and UE, respectively. The autonomous denial rule can be defined with various parameters. According to one option, the autonomous denial rule is mainly determined according to one aspect by a so-called prohibit timer. This means that after a user equipment performs LTE autonomous denial, the prohibit timer starts to run and it is not allowed to perform another autonomous denial until the prohibit timer expires. In such scenario, at least a timer value will have to be set in a stage S20. According to another option or scenario, an user equipment is only allowed to perform a limited number of autonomous denials during a certain period. In such scenario, the rules will need to provide for setting the certain period as well as for setting the admitted number of autonomous denials.

In a stage S21, likewise to stage S20, eNB 1 and UE 2 provide for setting an exception event, which, when the exception event occurs, may overrule the LTE autonomous denial rules as set above.

This provision for a setting of an exception even can also be accomplished via IDC indication/response procedure or other suitable signaling. As an example for an exception event, significant rare ISM signalings (SRIS) can be agreed. This can for example be decided based on the reception power of the ISM signaling and/or of the frequency of occurrence of the signaling ("rare") and/or be based on any other ISM specific transmission property of such ISM signaling such as frequency bandwidth in which it occurs or the like or a ISM signaling type such as a WiFi™ Beacon. Stages S20 and S21 are illustrated as separate stages. However, in an option (not shown) the settings could be provided in a single stage. In a stage S22a, it is assumed as shown in FIG. 2 that LTE communication takes place between eNB 1 and UE 2. In a stage S22, originating from the source of the ISM such as an ISM/WiFi access point 3, a first significant ISM transmission which needs LTE autonomous denial mechanism is received at the user equipment 2 in stage S22. The UE 2 then in stage S23 applies the set autonomous denial rule or rules. Responsive thereto, in stage S23a, the UE denies an uplink LTE transmission towards the eNB. This is illustrated in dotted line to show that this transmission is not actually taking place.

In a stage S24, responsive to the uplink LTE transmission denial based on application of the autonomous denial rule or rules, the UE 2 or the apparatus 21 thereof shown in FIG. 1(b) starts an autonomous denial rule timer (or a counter per time) dependent on which of the above-outlined basic methods are applied. In stage S25, a second significant ISM transmission which needs LTE autonomous denial is received from the access point 3. In a stage S26, it is detected as an exception event, if the criteria for qualifying as an exception event are fulfilled (which for the purpose of FIG. 2 is assumed). Responsive thereto, in a stage S27, the UE 2 sends an ADR violation indication to the eNB and also in a stage S28 denies another LTE uplink transmission and insofar violates the ADR rule because the ADR timer or counter per time started in S24 has not yet expired (count value reached). Stages S27/S28 can also optionally be reversed in order. Further, responsive to the ADR violation indication sent to the eNB, eNB 1 and UE 2 may enter into a stage S29 to provide for adjusted settings of autonomous denial rules. Once those adjusted settings are agreed upon, the UE will apply the adjusted rules as shown in a stage S29a. Mechanisms in terms of signaling and so on that can be used to provide for adjusted settings of the ADR's can be the same or similar to those used for providing for the initial settings of ADR's as in stages S20/S21.

Figure 3:
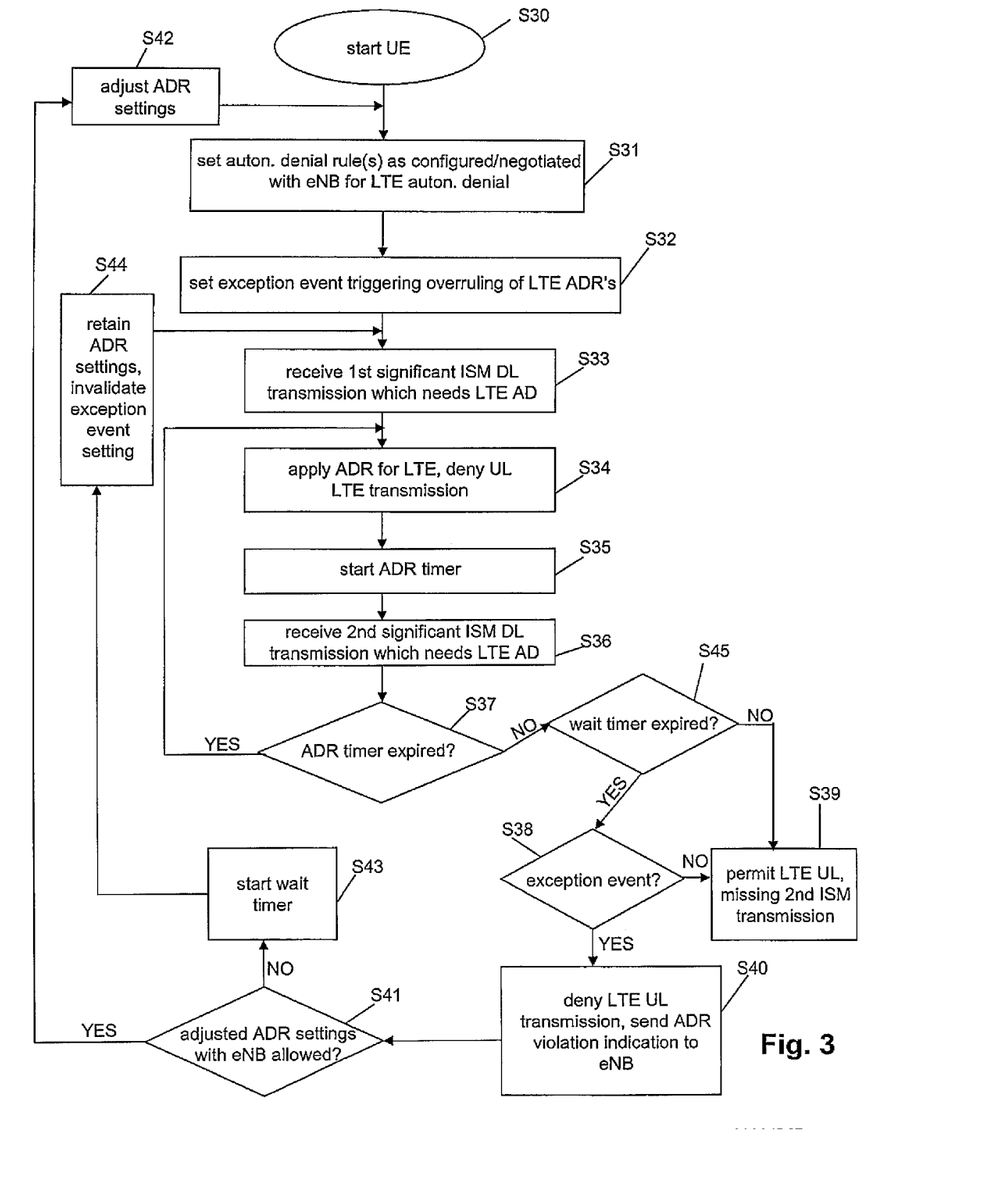
FIG. 3 illustrates an example scenario for an example aspect according to the invention related to a processing at a UE.

FIG. 3 illustrates an example scenario for an example aspect according to the invention related to a processing at a UE. FIG. 3 shows a flowchart which explains at least some aspects of the present invention as implemented at a terminal (2 in FIG. 1(b)) or at an apparatus 21 provided at a user equipment (with reference to FIG. 1(b)). The procedure starts in a stage S30. In a stage S31, autonomous denial rules are set as configured or negotiated with an eNB for LTE autonomous denial. In a stage S32, an exception event is set, which, when occurring, will trigger an overruling of LTE ADR's. In a stage S33, a first significant ISM downlink transmission which needs LTE autonomous denial is received. In a stage S34, the autonomous denial rules, ADR, are applied for LTE so as to deny uplink LTE transmission. Responsive thereto, an ADR timer is started or launched in stage S35. As mentioned earlier, the timer value or time period for which this timer runs is part of the setting of the autonomous denial rule or rules. In a stage S36, a second significant ISM downlink transmission which needs LTE autonomous denial is received. In a stage S37, it is checked whether the ADR timer expired. If the ADR timer expired (YES in S37), the process returns to stage S34 and the autonomous denial rules ADR are applied for LTE. If the ADR timer did not expire (which normally would mean that it is not allowed to perform another autonomous denial until the timer expires), the process proceeds to a stage S45. In stage S45, it is checked whether a wait timer (distinct from the ADR timer) expired. Also the wait timer is part of the settings provided for in stage S31. If the wait timer did not expire, the process proceeds further to stage S39. According to the processing in stage S39, LTE uplink transmission is permitted and, hence, the second ISM transmission to be received will be missed.

However, returning to stage S45, in case the wait expired (YES in S45), the process proceeds to stage S38. In stage S38, it is checked whether an exception event is present. Presence of an exception event here refers to the second significant ISM downlink transmission. If this qualifies according to the settings (cf. S32) as exception event, the process proceeds to S40. If not (NO in S38), the process proceeds to stage S39. In S40, however, for such case of an exception event being present, the LTE uplink transmission is denied again, although the ADR timer did not expire earlier, and an ADR violation indication is sent to the eNB. The ADR violation indication also triggers an adjustment of ADR settings. Therefore, in a stage S41 following S40, it is checked whether adjusted ADR settings with the eNB are allowed or possible. If yes, the process proceeds to a stage S42 where the ADR settings are adjusted and then set in stages S31 and S32, for example. The adjustment procedure is similar to the setting in that the adjustment can be either configured (as a default adjustment in such case) or negotiated between eNB and UE. If such adjustment is not allowed (NO in S41), the process proceeds to S43 where the previously mentioned wait timer is started. If the wait timer is started, in a subsequent stage S44, the ADR settings are retained as they were previous and the exception event setting is invalidated. After S44, the process returns to stage S33. Thus, the wait timer is proposed with the effect that if the eNB does not allow the user equipment to extend the denial rate or to violate the previously set autonomous denial rules, then the user equipment shall not exceed/violate those rules anymore until that timer expires. Stated in other words, if the eNB denies the UE request (ADR violation indication) to use more autonomous denials than agreed before, the UE shall not exceed the rules anymore for a relatively long time (the wait timer time). The wait timer time period could be signaled to the user equipment also in the above-mentioned negotiation signaling or also be negotiated or be fixed according to the standard. If, however, the eNB allows the UE to use more autonomous denials in the new negotiation (adjusted ADR settings), the new autonomous denial rules (adjusted ADR settings) are taken into use and are set as the new autonomous denial rules configured or negotiated. In such adjustment of autonomous denial rules, the prohibit timer referred to as ADR timer in FIG. 3 could be decreased so as to more frequently allow for uplink LTE transmission denial, or the number of denials per time, i.e. the denial rate, could be increased so as to represent a limitation of autonomous denials for a subsequent period or cycle.

In this way, a user equipment can receive a significant rare ISM signaling even if a current autonomous denial rule is not met and such additional autonomous denial will not cause an eNB misbehavior and may also provide for triggering an adjustment of the autonomous denial rule to accommodate the entities to a new scenario. Thus, according to at least an example aspect of the present invention, an IDC autonomous denial prohibition mechanism is proposed which is flexible in that it allows a user equipment to receive a significant rare ISM signaling as an exception event even if the autonomous denial rule (such as timer expiry or rate) is violated. Hence, the proposed mechanism is more robust and efficient compared to pre-existing autonomous denial prohibition mechanisms.

Figure 4:
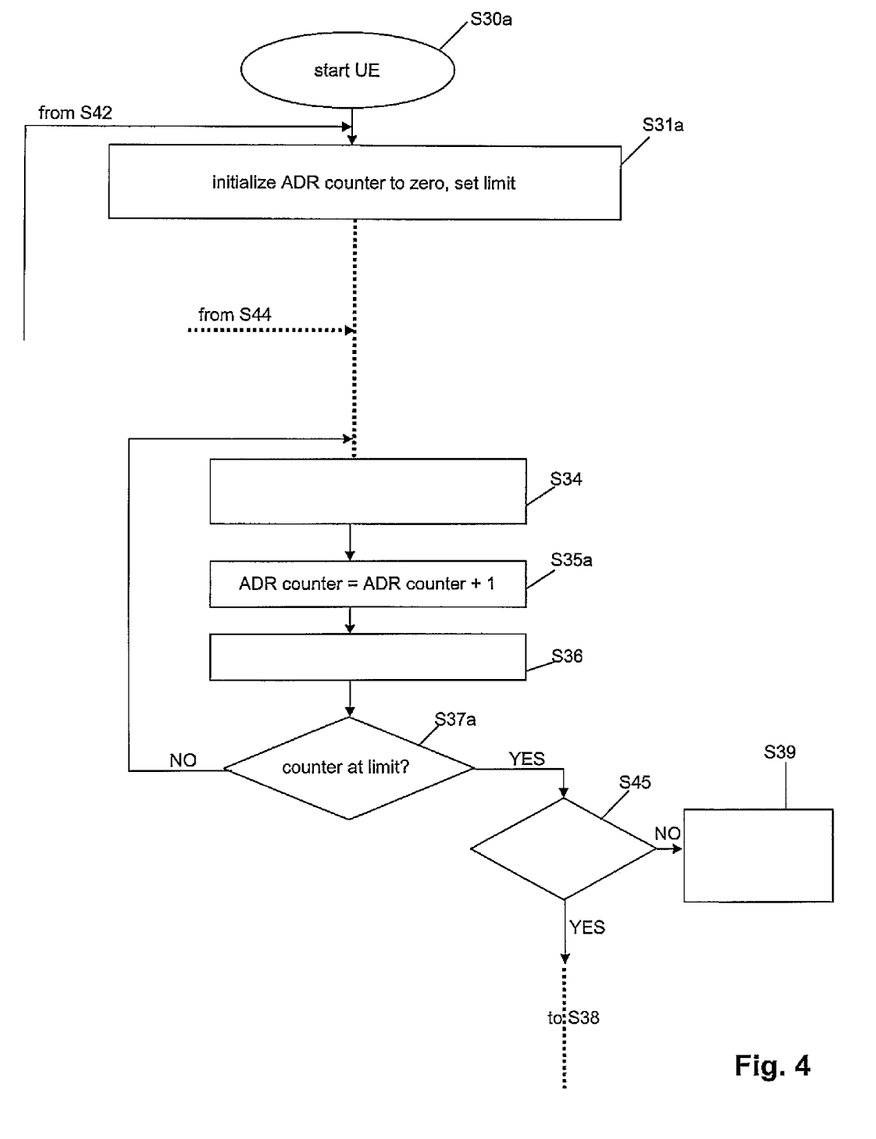
FIG. 4 illustrates a modification of the example scenario shown in FIG. 3.

FIG. 4 illustrates a modification of the example scenario shown in FIG. 3. FIG. 4 shows a flowchart of a processing performed at a user equipment according to at least another example of an aspect of the present invention. Mainly the differences compared to the processing described with reference to FIG. 3 are described in the subsequent section. Likewise, in FIG. 4 the process starts in a stage S30a. In a stage S31a similar to a stage S31, an ADR counter is initialized to zero and limit for autonomous denials is set within a certain period. Thus, the counter is initialized, a limit number is defined, and the period in which the limit number is allowed to occur is defined and set. Subsequent states following S31a are largely similar to the procedures as described with reference to FIG. 3. For example, also input after stage S42 and input after stage S44 are received, stage S34 is executed and then, in a stage S35a, the ADR counter is incremented by one so that a new counter value ADR counter is ADR counter+1. Stage S36 is executed as in FIG. 3, and in a stage S37a, it is determined whether the counter is at its limit that is whether the counted value is greater than or equal to the limit value. If not (NO in S37a), the process returns to stage S34. In a subsequent loop, the ADR counter will be incremented again and in a subsequent stage S37a, the check whether the counter is at its limit will be confirmed (YES in S37a). Then, the process proceeds to stage S45 and afterwards the processing is again similar as in FIG. 3. It is to be noted that, while incrementing and counting in this figure, the certain period is always monitored so that it can be assured that the counter is checked always with reference to the certain period of time during which the count may occur. However, for purposes of keeping the drawing simple and not too complex, this aspect has been neglected in the graphical illustration here.

Hereinbefore, aspects of the present invention have been described with reference to LTE and ISM/WiFi™. However, other radio access technologies are likewise applicable. For example, a radio access technology or frequency band used for global navigation satellite systems such as the global positioning system GPS or Galileo or Glonass can alternatively or additionally be present compared to ISM/WiFi™. Thus, the number of radio access technologies present at a user equipment is not limited to two but can be three or four or even more.

Furthermore, hereinbefore the autonomous denial mechanism as an example has been described with reference to aspects of the present invention only in connection with an autonomous denial for the LTE transmission in case of an ISM reception (with a focus on the UE perspective), i.e. an LTE uplink transmission from the UE towards the eNB would be autonomously denied in order to allow receipt of an incoming (downlink) ISM transmission at the UE. In any case, similar autonomous denial mechanisms and rules can be defined to apply for a pairing of radio access technologies such as LTE and GNSS, or even for a pairing of ISM/GNSS.

Any such autonomous denial rules can be defined differently per pair of radio access technology. Thus, a UE may apply different autonomous denial rules for an ISM-LTE configuration as compared to autonomous denial rules for a GNSS-LTE configuration.

Furthermore, the above-described aspects of the invention were given with reference to an example of denying an LTE uplink transmission in order to enable an ISM downlink transmission. In another modification, additionally or alternatively, the mechanism(s) can also be adapted so as to use an autonomous denial mechanism in order to provide for LTE reception denial and to allow consequently for a critical ISM transmission. Examples of such "critical" or "significant ISM transmission may be a Bluetooth™ connection setup or WiFi™ association, or GNSS location update, or the like. Further, such mechanisms can also be applied to other pairings of radio access technologies, as mentioned hereinbefore. Any such modification can have specific advantages in a specific use case.

Thus, as will be apparent from the above, according to at least examples of aspects of the invention, a UE and an eNB may discuss with each other via IDC indication/response procedure to set up the autonomous denial rule, such as deciding on the prohibit timer (i.e ADR timer and/or wait timer) or autonomous denial time/rate limitation (ADR counter limit and period). The UE and eNB may also discuss or negotiate with each other via e.g. IDC indication/response procedure to decide on what constitutes a "significant rare ISM signaling" (SRIS) representing an exception event, which could override the prohibit timer or autonomous denial time/rate limitation. If the UE has to receive an unexpected SRIS, while it doesn't meet autonomous denial rule, it will send a new proposed autonomous denial indication with SRIS name to the eNB, and it is enabled to autonomously deny LTE UL, even if the autonomous denial rule would be violated. Such new autonomous denial indication (e.g. ADR violation indication) can be one of a new RRC, MAC CE or L1 signaling. In other words, the UE may exceed the autonomous denial rules once, but it shall start the negotiation for new rules.

If the event above happens, in a first scenario, the eNB an UE could try to adjust the autonomous denial rule such as to increase the prohibit timer or decrease the autonomous denial time/rate limitation for the next period. For example, with reference to this scenario, if the UE auto-denies more times than it should be, then it may auto-deny less times in the next period or cycle to make a balance if there is no negotiation process.

On the other hand, if the event above happens, in a second scenario, the eNB and UE could try to adjust the autonomous denial rule such as to decrease the prohibit timer or increase the autonomous denial time/rate limitation for the next period, so as to allow already for more regular denials in a subsequent period or cycle after renegotiating the ADR settings. Also, apart from the number of permitted denials, the time or period for which the number of denials is determined can be adjusted, thereby also adjusting denial rate. I.e. the number of permitted denials per period may be adjusted by adjusting the number and or the period.

Then, if the eNB allows the UE to use more autonomous denials in the new negotiation, the new prohibit timer and other denial rules are taken into use. Whereas, if the eNB denies the UE request to use more autonomous denials, the UE shall not exceed the rules any more for some relatively long time. This time is represented by a wait timer explained above, which may be a fixed time written in the standard, a semi-static time broadcast by the eNB in one of its broadcast channels, or signaled to the UE in the setup or in the mentioned negotiation signaling. The wait timer value also may be adjusted in the negotiation.

In this way, UE could receive significant rare ISM signaling even the current autonomous denial rule is not met and this additional autonomous denial will not cause eNB misbehavior and could also adjust the autonomous denial rule to accommodate to the new scenario. The IDC autonomous denial prohibition mechanism thus allows the UE to receive significant rare ISM signaling even if the autonomous denial rate is not met.

From the above, it is thus to be understood that a significant ISM signaling may be an example to be referred to as a predetermined event, and that a further significant ISM signaling be an example to be referred to as a further predetermined event or exception event. A first timer (value) is exemplified by the ADR timer (value) referred to in FIG. 3 and related description, while a second timer (value) is exemplified by the wait timer (value) referred to in FIG. 3 and related description. A number of permitted denials corresponds to the example of a limit for an ADR counter within a period, referred to in FIG. 4 and related description.

Various aspects of the present invention have been described herein above, on a general as well as on a specific implementation oriented level. It is still to be noted that some embodiments of the invention may be implemented in software, hardware, application logic or a combination of software, hardware and application logic. The software, application logic and/or hardware generally reside on control modules or modems, in general circuitry. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term 'circuitry' refers to all of the following:

(a) hardware-only circuit implementations (such as implementations in only analog and/or digital circuitry) and (b) to combinations of circuits and software (and/or firmware), such as (as applicable):

(i) to a combination of processor(s) or (ii) to portions of processor(s)/software (including digital signal processor(s)), software, and memory(ies) that work together to cause an apparatus, such as a mobile phone or user equipment or any other terminal, or network entity such as a server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone (terminal) or a similar integrated circuit in server, a cellular network device, or other network device.

That is, it can be implemented as/in chipsets to such devices, and/or modems or apparatuses or units thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

LIST OF ACRONYMS AND ABBREVIATIONS

ADR Autonomous Denial Rules
eNB Enhanced Node B.
LTE Long Term Evolution
LTE-A Long Term Evolution Advanced
IDC In Device Co-Existence
3GPP 3rd Generation Partnership Project
2G/3G/4G 2nd/3rd/4th Generation
cdma2000 Code Divisional Multiple Access 2000
DL Downlink
GSM Global System of Mobile Communication/Groupe Spécial Mobile
HSDPA High Speed Digital Packet Access
IEEE Institute of Electrical and Electronics Engineers
IETF Internet Engineering Task Force
IMS IP Multimedia Subsystem
IP Internet Protocol
PDCCH Physical Downlink Control Channel
RAN Radio Access Network
RAT Radio Access Technology
TDM Time Divisional Multiplexing
FDM Frequency Divisional Multiplexing
Tx Transmit
Rx Receive
UE User Equipment
UL Uplink
UMTS Universal Mobile Telecommunication System
WCDMA Wideband Code Divisional Multiple Access
RRC Radio Resource Control
MAC Media Access Control
CE Control Element
L1 Layer 1
WiFi Trademark of Wi-Fi Alliance/WECA (Wireless Ethernet Compatibility Alliance)
ISM Industrial Scientific Medical
WLAN Wireless LAN
LAN Local Area Network
LA Link Adaptation Aspects of the invention encompass an apparatus and corresponding method and computer program product, wherein the apparatus comprises a controller, configured to cause communication via a first and at least a second radio access technology, provide for setting of rules, which permit the apparatus to autonomously deny communication via the first radio access technology, detect a predetermined event in terms of the second radio access technology, responsive thereto, apply the rules and deny a communication via the first radio access technology, detect an occurrence of a further predetermined event in terms of the second radio access technology, while the rules prohibit to further deny a communication via the first radio access technology, decide, responsive thereto, to violate the rules and to permit to deny a further communication via the first radio access technology, and cause transmission of a violation indication to a destination of the communication via the first radio access technology. A network entity apparatus and corresponding method and computer program product are also envisaged.

What is claimed is:

1. An apparatus, comprising:
    a controller, configured to
        cause communication via a first and at least a second radio access technology, provide for setting of rules, which permit the apparatus to autonomously deny communication via the first radio access technology, detect a predetermined event regarding the second radio access technology, responsive to the detection of the predetermined event, apply the rules and deny a communication via the first radio access technology, detect a further predetermined event regarding the second radio access technology, while the rules prohibit denial of communication via the first radio access technology, decide, responsive to the detection of the further predetermined event, to violate the rules and to further deny communication via the first radio access technology, and cause transmission of a violation indication to a destination of the communication via the first radio access technology.

2. An apparatus according to claim 1, wherein,
to provide for setting of the rules, the controller is further configured to cause reception of a configuration from a network entity adapted to communicate with the apparatus via the first radio access technology.

3. An apparatus according to claim 1, wherein,
to provide for setting of the rules, the controller is further configured to cause negotiation of rules with a network entity adapted to communicate with the apparatus via the first radio access technology.

4. An apparatus according to claim 1, wherein
the rules comprise a first timer value defining a period during which no further denials are permitted, or
comprise a number of permitted denials per period, and
comprise a second timer value defining a period during which set rules are to be retained and during which no violation of the set rules is admitted.

5. An apparatus according to claim 1, wherein
the rules comprise detection criteria for detection of a predetermined event in terms of the second radio access technology.

6. An apparatus according to claim 1, wherein
the controller is further configured to
trigger to adjust setting of adjusted rules responsive to transmission of the violation indication.

7. An apparatus according to claim 6, wherein
the controller is further configured to
determine that adjusting settings is not permitted, and responsive thereto, start the second timer.

8. An apparatus according to claim 6, wherein
the controller is further configured to
determine that adjusting set rules is permitted, and responsive thereto, adjust the set rules.

9. An apparatus according to claim 8, wherein
adjustment of rules comprises at least one of
extending or shortening the at least one of the first or second timer values,
increasing or decreasing the number of permitted denials per period, changing the detection criteria for detection of the predetermined event.

10. A method, comprising:
causing communication via a first and at least a second radio access technology,
providing for setting of rules, which permit the apparatus to autonomously deny communication via the first radio access technology, detecting a predetermined event regarding the second radio access technology, responsive to the detection of the predetermined event, applying the rules and deny a communication via the first radio access technology, detecting a further predetermined event regarding the second radio access technology, while the rules prohibit denial of communication via the first radio access technology, deciding, responsive to the detection of the further predetermined event, to violate the rules and to further deny communication via the first radio access technology, and causing transmission of a violation indication to a destination of the communication via the first radio access technology.

11. A method according to claim 10, wherein,
providing for setting of the rules further comprises
causing reception of a configuration from a network entity adapted to communicate with the apparatus via the first radio access technology.

12. A method according to claim 10, wherein,
providing for setting of the rules further comprises
causing negotiation of rules with a network entity adapted to communicate with the apparatus via the first radio access technology.

13. The method according to claim 10, wherein the rules comprise a first timer value defining a period during which no further denials are permitted, or
comprise a number of permitted denials per period, and
comprise a second timer value defining a period during which set rules are to be retained and during which no violation of the set rules is admitted.

14. The method according to claim 10, wherein the rules comprise detection criteria for detection of a predetermined event in terms of the second radio access technology.

15. The method according to claim 13, further comprising triggering setting adjustment of adjusted rules responsive to transmission of the violation indication.

16. The method according to claim 15, further comprising:
determining that adjustment is not permitted; and
starting a second timer when adjustment is not permitted.

17. The method according to claim 15, further comprising:
determining that adjustment is permitted; and
adjusting the adjusted rules when adjustment is determined to be permitted.

18. The method according to claim 17, further comprising:
extending or shortening the at least one of the first or second timer values;
increasing or decreasing a number of permitted denials per period; and
changing the detection criteria for detection of the predetermined event.

19. A non-transitory computer-readable medium encoded with computer readable instructions thereon that, when executed by a processor, cause the processor to perform a method comprising:
causing communication via a first and at least a second radio access technology,
providing for setting of rules, which permit the apparatus to autonomously deny communication via the first radio access technology, detecting a predetermined event regarding the second radio access technology, responsive to the detection of the predetermined event, applying the rules and deny a communication via the first radio access technology, detecting a further predetermined event regarding the second radio access technology, while the rules prohibit denial of communication via the first radio access technology, deciding, responsive to the detection of the further predetermined event, to violate the rules and to further deny communication via the first radio access technology, and causing transmission of a violation indication to a destination of the communication via the first radio access technology.

* * * * *